March 15, 1932.　　　L. M. PAYNE　　　1,849,152
THERMOSTAT CONSTRUCTION
Filed Oct. 16, 1929
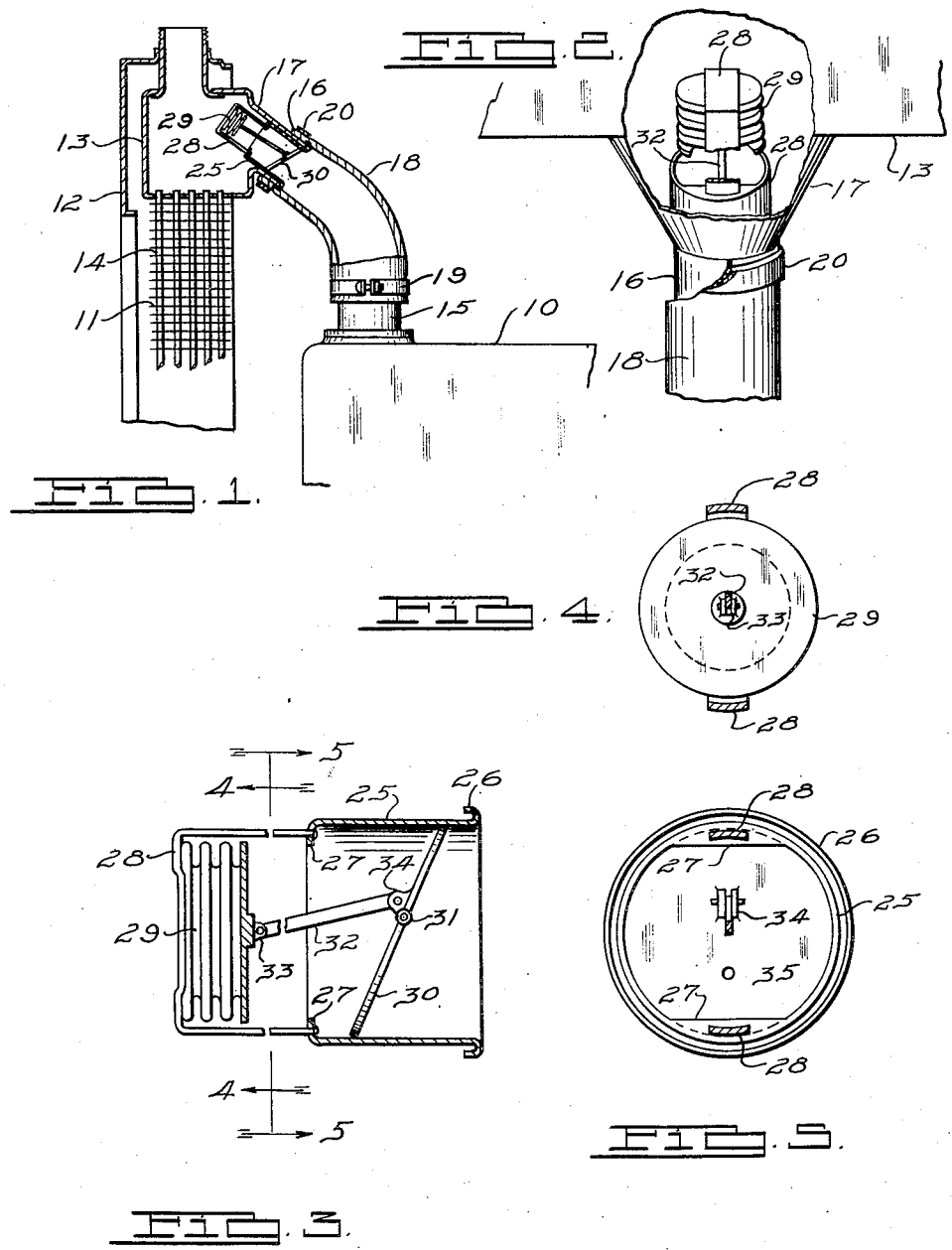
INVENTOR
Lambert M. Payne.
BY
Harness, Dickey & Pierce
ATTORNEYS Patented Mar. 15, 1932

1,849,152

UNITED STATES PATENT OFFICE

LAMBERT M. PAYNE, OF DETROIT, MICHIGAN

THERMOSTAT CONSTRUCTION

Application filed October 16, 1929. Serial No. 400,126.

This invention relates to thermostatic valves, and particularly to such valves as are employed in connection with the cooling system of internal combustion engines employed on motor vehicles and the like, the principal object being the provision of a construction that is simple in design and readily applicable to a system not initially provided with such a valve, without necessitating any changes in the parts of said system in any respect whatsoever.

Another object is the provision of a thermostatic valve for a water circulation system in which the thermostatic element is placed at the far side of the valve in respect to the direction of flow of cooling medium toward the valve.

Another object is the provision of a thermostatically controlled valve adapted to be inserted in the water connection between the engine and the radiator of a motor vehicle and maintained in position therein by the usual hose connection therebetween.

Another object is the provision of a thermostatically controlled valve for a motor vehicle not equipped in production with such a valve, and which is insertable in the water passage between the engine and the radiator water header, without the necessity of changing either the engine, the water header, or any of the parts connecting them.

Another object is the provision of a thermostatically controlled valve for the cooling system of a motor vehicle comprising a valve and a thermostatic element operatively connected together, the valve being received within the radiator inlet connection and the thermostatic element being positioned inwardly of the inlet connection with respect to the water header.

Another object is the provision of a thermostatically controlled valve structure insertable into the connection between the water jacket and radiator header of a motor vehicle, and so arranged that the thermostat does not restrict the free flow of cooling medium between the engine and the radiator.

Another object is the provision of a novel means for securing the thermostatically controlled valve within the water passage connecting the engine and radiator water header of a motor vehicle.

A further object is the provision of certain novel features of construction that will be specifically pointed out, or will be obvious in the following description.

The above being among the objects of the present invention, the same consists in certain novel features of construction and combination of parts to be hereinafter described with reference to the accompanying drawings, and then claimed, having the above and other objects in view.

In the accompanying drawings which show a suitable embodiment of the present invention, and in which like numerals refer to like parts throughout the several different views:

Fig. 1 is a more or less fragmentary partially broken view showing the water connections between the engine and radiator water header of a motor vehicle, and through which the flow of water is controlled by a thermostatically actuated valve mechanism.

Fig. 2 is an enlarged fragmentary view of the valve mechanism in Fig. 1 taken from the right hand side of Fig. 1 and illustrating the construction of the water header at this point and the relation of the thermostatic element thereto.

Fig. 3 is an enlarged sectional view taken centrally through the axis of the thermostatically controlled valve.

Fig. 4 is a sectional view taken on the line 4—4 of Fig. 3.

Fig. 5 is a sectional view taken on the line 5—5 of Fig. 3.

There are a great many motor vehicles that are offered for sale to the public today that are not provided with and in which no provisions have been made for providing a thermostatically controlled valve for controlling the temperature of the cooling fluid in the engine. The present invention has particular reference to this class of motor vehicles in that it provides a thermostatically controlled valve that may be applied to such constructions without necessitating the change or alteration of any parts of the motor vehicle as received by the purchaser, and furthermore provides a construction which will not materially lessen the previous free flow of water through the cooling system, when the valve is open. Although the present invention is particularly adaptable to such class of motor vehicles, it is to be understood that it is not to be restricted in all of its phases to such so-called "service installation", as many of its features are equally well adapted to constructions which are intentionally formed during manufacture for its provision in the cooling system.

Referring to the accompanying drawings, I show in Fig. 1 at 10 the engine of a motor vehicle, and in the usual position with respect thereto a radiator generally indicated at 11. As in conventional constructions the radiator includes a shell 12 and a water header 13 concealed within the upper part of the shell 12 and connected through its bottom with a plurality of tubes 14 which extend downwardly to a cooperating lower water header (not shown) which may be connected to the engine in conventional manner. The engine 10 is provided with a water outlet connection 15 communicating with the water jacketed portion of the engine 10. The water header 13 is provided with a water outlet connection comprising a tubular portion 16 and a funnel-shaped portion 17 leading into the header 13. The provision of the funnel portion 17 is conventional practice in some motor vehicles, although its use is not essential to the practice of the present invention, as will hereinafter be apparent. In fact, I prefer, in the explanation of the present invention and the interpretation of the claims thereof, to consider the funnel portion 17 as a part of the water header 13, when used. As is conventional practice, a hose 18 of rubber or similar material connects the tubular portion 16, shown as inclined, with the outlet connection 15 of the motor 10 in order to permit the hot water from the engine 10 to flow into the header 13. As is also conventional practice, so-called "hose clamps" 19 and 20 are employed for clamping the hose 18 to the outlet connection 15 and the tubular portion 16 respectively, so as to prevent the leakage of water at these points.

Where thermostatically controlled valves have heretofore been provided in the passage between the water header and the engine, the thermostatic element employed for operating the valve has frequently been placed on that side of the valve nearest the engine 10. The result, in such cases, has been that regardless of the position of the valve in this water passage, it has been necessary to make provision for increasing the size of the water passage at the point where the thermostatic valve is received, in order to prevent restriction of the flow of water through the passage at the valve unit when the valve is opened, this being necessary in order to prevent overheating of the engine in hot weather and under extreme power conditions. In other instances, where motor vehicles have been placed on the market without a thermostatic valve and without provisions for the insertion of a thermostatic valve, the introduction of such a valve into the water passage in any of the conventional manners of application of such valves has commonly necessitated the replacement of parts or the alteration of parts in the passage between the engine and the water header in order to prevent the restriction that would otherwise be caused by the presence of the thermostatic element in such water passage. It is obvious that either the replacement of parts or the alteration of parts in order to apply a thermostatic valve to such cars would require an unwarranted expense on the part of the car owner. Accordingly, I have provided, in accordance with the present invention, a construction by which a thermostatically controlled valve may be inserted at the outlet of such water passage without materially restricting such passage to the flow of water when the valve is opened, and in which there is no necessity for altering or changing any parts of the motor vehicle as received by the owner. This is accomplished in the following manner:

The thermostatic controlled valve unit comprises a tubular body portion 25, coaxial with the mentioned tubular inlet portion, extending toward the engine, one end of which portion is shown as bent, outwardly and back upon itself in spaced relation with respect to the main body 25 as at 26. The opposite end of the main body portion 25 is shown as slidably received in tubular portion 16 and as provided with thermally conductive thermostat supporting means including two or more inwardly turned flange portions 27, preferably no larger in area in end view of the main body portion 25 than is necessary for the purpose thereof. To the inturned flange portion 27 is secured the free ends of a U-shaped sheet metal strap member 28, the ends of which are preferably secured to the flanged portion 27 by means favorable to thermal conductivity, said means optionally including a staking operation, although it is to be understood that the particular manner of securing the strap 28 to the main body portion 25 is more or less immaterial as far as the practicability of the present invention is concerned. Secured to the bottom of the U-shaped strap 28 and in coaxial relationship to body 25 a thermostatic element 29 is shown in the drawings in the form of a metallic bellows of conventional construction. This is preferably filled with a volatile liquid adapted to gasify at a predetermined temperature less than the boiling point of water, as in conventional constructions. Within the main body portion 25 is a butterfly valve 30 pivoted to the side walls thereof as at 31 along a line slightly to one side of a diametrical line of the valve circle parallel to the pivotal axis of the valve 30. A link 32 is pivotally connected to the free end wall of the bellows 29 as at 33 and pivotally connected to the valve 30 on the short side thereof with respect to the pivotal axis thereof as at 34 this construction being such that expansion of the thermostatic element against flow tends to open valve 30 in the direction of flow, the thermostat being on the upper but "downstream" side of the valve and directly in the path of flow.

It will be apparent that with this construction, when the bellows 29 expands under the influence of heat applied thereto the valve 30 will be caused to pivot in a clock-wise direction as viewed in Fig. 3, so as to open the main body portion 25 to the flow of fluid therethrough, and that when the bellows 29 is in contracted position as indicated in the drawings, the valve 30 will close the main body portion 25 to the flow of fluid therethrough.

In accordance with the present invention, the main body portion 25 is formed so as to be slidably received within the inlet 16 for the radiator header 13 and is inserted therein, thermostat end first, sufficiently to bring the free edge thereof within the reversely bent portion 26 of the main body portion 25, the reversely bent portion 26 preventing further inward movement of the valve structure with respect to the inlet. The side arms of the strap 28 are made of sufficient length so as to bring the thermostatic element 29 well within the funnel-shaped portion 17 of the water header so that there is at least as great an area around the sides of the thermostatic element 29 for the flow of water past it as the cross sectional area of the hose 18 or inlet 16. Thus the thermostatic element 29 is so positioned that its presence within the water circulation system has no restricting effect upon the proper circulation of water in the system. It is to be understood that where no funnel-shaped portion 17 is employed, the sides of the strap 28 are of sufficient length to bring the bellows 29, or other thermostatic element when employed, within the main body portion of the water header 13 whereby to prevent a restriction of the flow through the inlet thereby. The butterfly valve 30 is preferably provided with a small bleeder opening 35 to permit a slight leakage of water through the valve when the valve is closed, so as to prevent any undue pressure from being built up within the cooling system.

The valve unit is maintained in its proper position within the inlet 16 by forcing the upper end of the hose 18 over the reversely bent portion 26 and clamping the hose to the inlet 16 by the clamp 20 in the usual manner, the friction between the hose 18 and the reversely bent portion 26 being sufficient to prevent any displacement of the valve unit from its proper location.

In operation, and considering the water within the cooling system as being at a temperature such as to have caused the bellows 29 to have moved the valve 30 to closed position when the engine is started up, the valve 30 will prevent a substantial circulation of the cooling fluid through the engine and radiator, and will result in a quick rise in temperature of the cooling fluid enclosed in the water jacket of the engine. Due to the small opening 35 and to the normal leakage between the valve 30 and the main body portion 25, the hot water rising into the hose 18 will find its way into contact with the thermostatic element 29, and when the temperature of this water has increased to a predetermined value the bellows 29 will expand and open the valve 30, thus permitting a circulation of the cooling fluid whereby to maintain the engine at the proper operating temperature. The temperature of the water coming into contact with the thermostatic element 29 will thereafter control the degree of the valve opening to maintain the proper temperature of the cooling system in the conventional manner. The valve 30 being pivoted to one side of one of its diametrical lines, has the tendency under the influence of the water pressure acting upon it, to open to permit a flow of water through the circulating system, this being desirable in that the water pressure thus aids the thermostat 29 in opening the valve and acts to prevent any possibility of the valve sticking and thus rendering it inoperative.

Although I prefer to employ the reversely bent end portions 26 on the main body portion 25 in order to better maintain the valve element against displacement, it is to be understood that this particular method of securing the main body portion 25 in place is not essential in the broadest aspects of the present invention, and it is also to be understood that other features of construction such as, for instance, the employment of the particular type of thermostatic element shown, is not essential to the proper practice of the broader aspects of the present invention.

Formal changes may be made in the specific embodiment of the invention described without departing from the spirit or substance of the broad invention, the scope of which is commensurate with the appended claims.

What I claim is:

1. In combination, a radiator water header, an inlet connection therefor extending toward an engine, an engine water jacket, an outlet connection therefor, a conduit connecting said inlet and outlet connections, a valve in said inlet connection controlling the flow through said conduit from said jacket to said header, a thermostat within said header, an operative connection between said thermostat and said valve, and a supporting structure for said valve and thermostat, said structure comprising a body slidably received in said inlet connection, and means retaining said thermostat coaxial therewith.

2. In combination, a radiator water header, an inlet connection therefor extending toward an engine, an engine water jacket, an outlet connection therefor, a conduit connecting said inlet and outlet connections, a valve in said inlet connection controlling the flow through said conduit from said jacket to said header and opening in the direction of flow therethrough, a thermostat within said header, an operative connection between said thermostat and said valve, and a supporting structure comprising a cylindrical body engageable with said inlet and said conduit for said valve and thermostat removably secured within said inlet.

3. In combination with a radiator water header having an inlet connection, a tubular body removably received within said connection, means for limiting movement of said body in said inlet in one direction, a valve in said body for controlling the flow of liquid therethrough, legs secured to said body and extending inwardly of said header beyond the restriction of said inlet, a thermostatic element carried at the inner ends of said legs, and means connecting said element and said valve for simultaneous operation.

4. In combination with a radiator water header having an inlet connection, a tubular body removably received within said connection, a flange on said body engageable with the end of said connection for limiting movement of said body in said inlet in one direction, a valve in said body for controlling the flow of liquid therethrough, legs secured to said body and extending inwardly of said header beyond the restriction of said inlet, a thermostatic element carried at the inner ends of said legs, and means connecting said element and said valve for simultaneous operation.

5. In combination with a radiator water header and the inlet connection therefor, a hose clamped about said connection, a tubular body removably received within said connection, a valve in said body for controlling the flow of liquid therethrough, legs secured to said body projecting inwardly thereof into said header, a thermostatic element carried at the inner ends of said legs, an operative connection between said element and said valve, and means on said body engaged by said hose for maintaining said body in position within said inlet.

6. In combination with a radiator water header and the inlet connection therefor, a tubular body removably received in said connection, said body having a reversely bent flange at its outer end socketing the outer end of said connection, legs secured to said body extending inwardly therefrom relative to said header, a valve in said body for controlling the flow of fluid therethrough, a thermostat carried at the inner ends of said legs, an operative connection between said thermostat and said valve, and a hose for said inlet connection embracing both said connection and said flange whereby to maintain said body in position within said inlet.

7. In combination with a cooling radiator having a reservoir portion, said reservoir portion having a short tubular hose connection projecting therefrom, a thermostatically controlled valve unit comprising a tubular body of such proportions as to slide conveniently within the hose connection, a bracket projecting inwardly into the reservoir from the inner end of the body and supporting a thermostat element secured upon its inner end, the bracket and the element being of such proportions as to slide conveniently through the tubular portion and being supported solely by the body, a valve disposed within the body member and controlling the passage therethrough and means operatively interconnecting the valve and the thermostat unit and additional means for preventing the body portion from passing entirely through the tubular portion into the reservoir.

8. In combination with a cooling radiator having a reservoir portion, said reservoir portion having a tubular hose connection projecting therefrom, a hose thereon, a thermostatically controlled valve unit comprising a tubular body of such proportions as to slide conveniently within the connection, a bracket projecting inwardly from the inner end of the body, a thermostat element upon its inner end, the bracket and the element being of such proportions as to slide conveniently through the tubular portions, and being supported solely by the body, a butterfly valve disposed within the body and controlling the passage therethrough and means operatively inter-connecting the valve and the thermostat unit and flange means engaging the end of the connection under the hose for preventing the body portion from passing through the tubular portion into the reservoir.

9. For combination with a radiator water header and a tubular inlet fixed thereto, a tubular member removably receivable within said inlet, one or more legs fixed to said member and projecting therefrom in the direction of said header, a thermostatic element carried by the inner ends of said legs, said element being of less external diameter than the internal diameter of said inlet whereby to be removable from said inlet with said member, a valve within said member for regulating the flow of liquid therethrough, and an operative connection between said valve and element.

LAMBERT M. PAYNE.